United States Patent Office 3,230,702
Patented Jan. 25, 1966

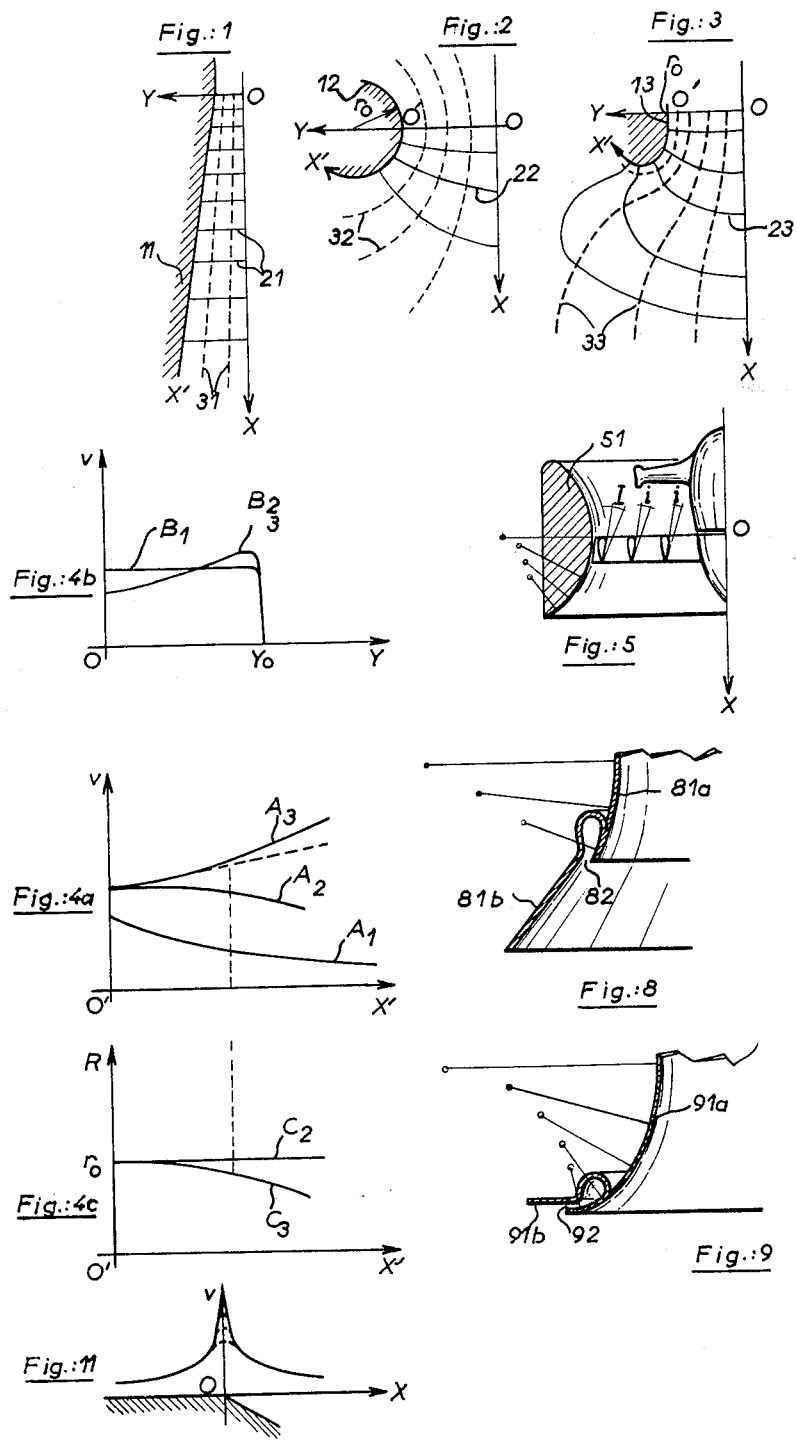

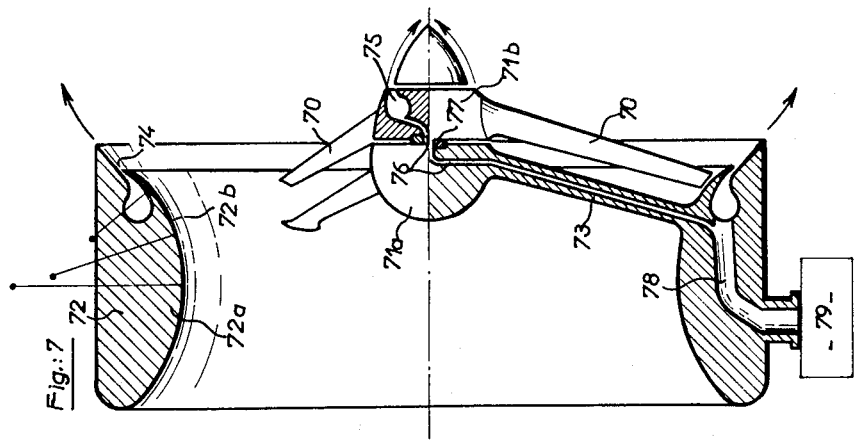
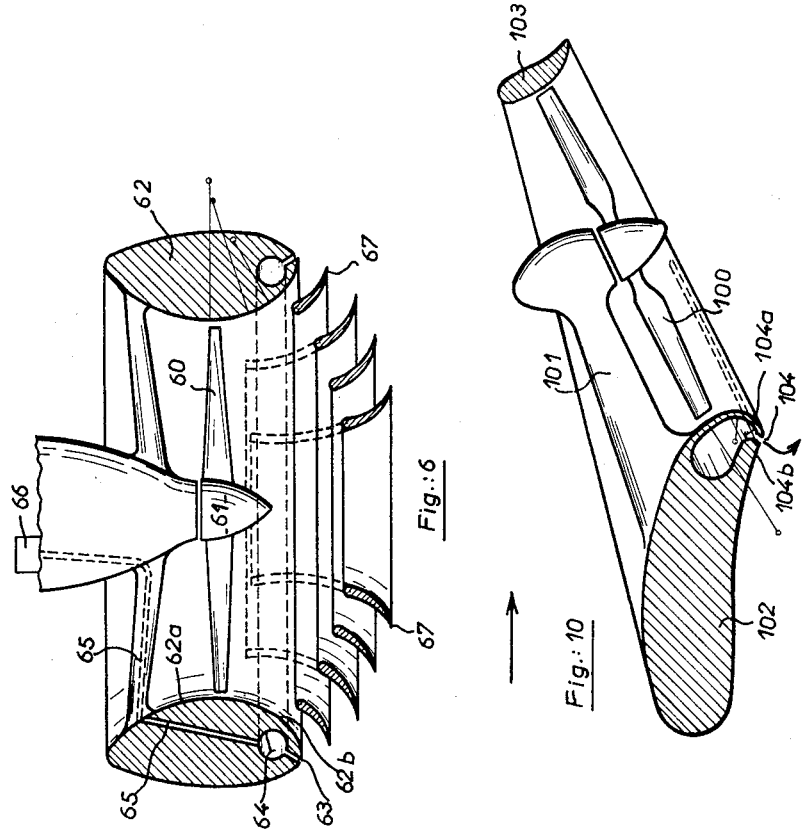

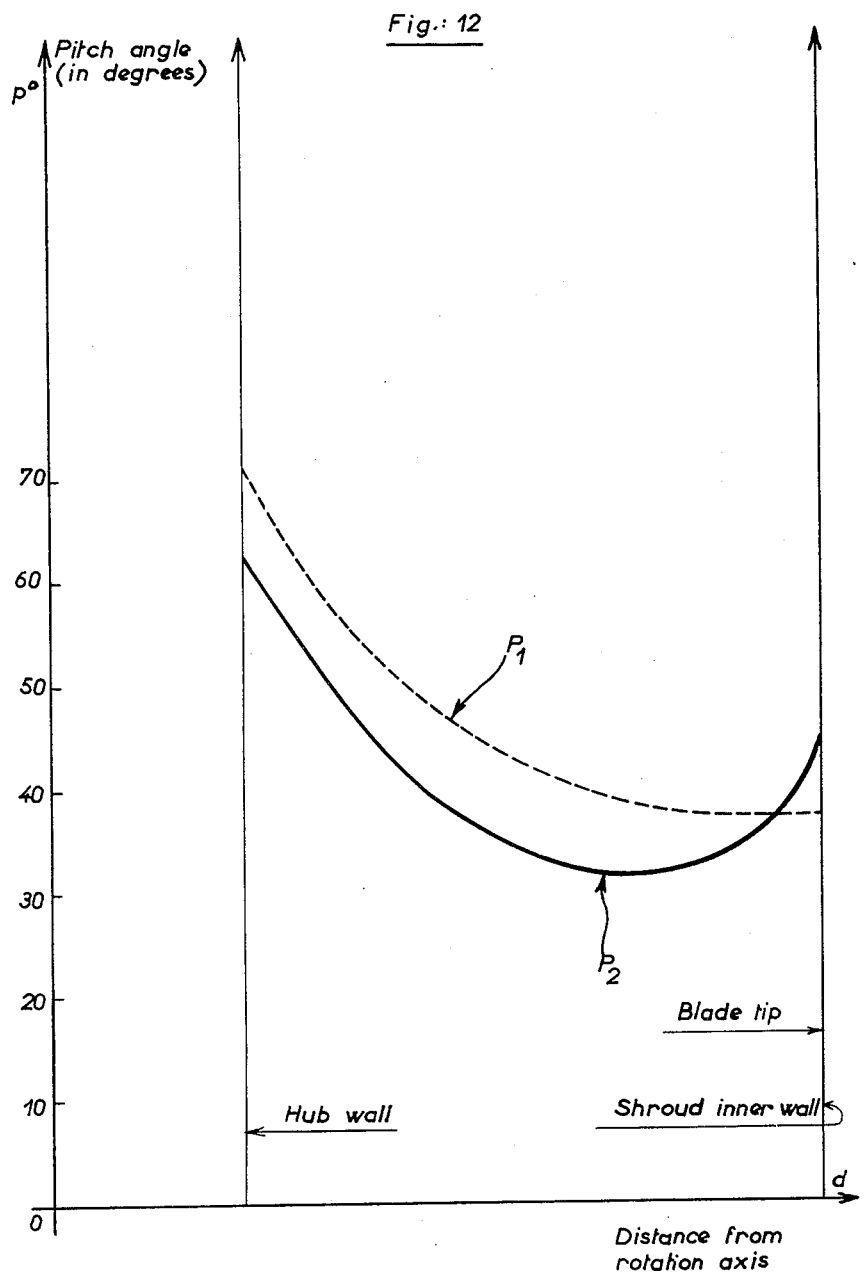

3,230,702
JET DIFFUSER USABLE AS A PROPELLER SHROUD
Jean Paul Marie Soulez-Lariviere, Paris, and Jean Henri Bertin, Neuilly-sur-Seine, France, assignors to Bertin & Cie, Paris, France, a company of France
Filed July 27, 1964, Ser. No. 385,372
Claims priority, application France, Oct. 16, 1959, 807,687
20 Claims. (Cl. 60—35.5)

This is a continuation-in-part of our application Serial No. 61,978 filed October 11, 1960, now abandoned.

This invention relates generally to solid-wall jet diffuser ducts and more particularly to a diffuser duct usable for aircraft in a shrouded propeller assembly.

Solid-wall jet diffuser ducts have been proposed which have a divergence angle (i.e. half the apex angle of a cone tangential to a given longitudinal section) greater than the limit to 3° to 4° found in the usual type of conical diffuser, and in which the divergence increase beyond said limit is made possible by disposing boundary layer control means along the solid wall. However, the power input required for such boundary layer control has proved too high in relation to the advantages accruing with respect to the diffusion ratio.

In order to obtain a substantial diffusion over a short axial length, it has been proposed to utilize a diffuser having a divergent fluid wall or screen extending a convergent solid wall which may be locally divergent downstream of the diffuser neck over a short length, whereby an annular nozzle is formed for generating the fluid wall. It goes without saying that in this case the length of the divergent solid wall is dependent upon the width of the annular nozzle and not upon the diameter of the diffuser neck. The length of said divergent solid wall does not exceed 10% of the diameter of the neck. The meridian curvature of the solid wall does not vary substantially and that of the divergent fluid wall naturally decreases downstream in the direction of the flow.

A principal object of the present invention is to provide a diffuser having a solid wall defining a divergent portion having a divergence angle which is as much as 30° without the use of any control means for the boundary layer and can be even more when such boundary layer control means are provided.

Another object is to provide a jet diffuser duct having a low drag and a high diffusion ratio for a given axial length, and which is usable for imparting propulsion and lift forces to air-craft.

Still another object is to provide a shrouded propeller assembly in which the shroud is a jet diffuser duct according to the invention. Such a shroud may have but one symmetry plane containing the propeller axis and the fluid stream displaced by the propeller may be deflected, in projection on said symmetry plane, at the same time as it is diffused.

Other objects and features of the present invention will be apparent from the following detailed description of specific embodiments thereof, given with respect to the accompanying non-limitative exemplary drawing, in which:

FIGS. 1 to 3 are flow diagrams of axial sections respectively relating to a common type of conical diffuser, a toroidal diffuser and a diffuser according to the present invention;

FIGS. 4a and 4b are speed plots and FIG. 4c is a curvature plot for comparing the functional characteristics of the diffusers of FIGS. 1 to 3;

FIGS. 5 to 7 are fragmentary axial sections of three embodiments of shrouded propellers according to the invention;

FIGS. 8 and 9 are fragmentary axial sections of other embodiments of the shrouded propeller of FIG. 7;

FIG. 10 is a section view, through a plane close to the symmetry plane, of a shrouded propeller whose thrust is orientable into the symmetry plane;

FIG. 11 is a plot of local velocities along the wall of a dihedron, in a plane perpendicular to the edge of the dihedron; and FIG. 12 is a plot of pitch angles allowing to compare a propeller according to FIG. 5 and an usual propeller.

Attempts have been made for several years to increase the static operating conditions of air-screws by shrouding them with a diffuser shroud which, without introducing substantial power losses, permits reducing the propeller disc area, which is the area such a shrouded propeller sweeps, in relation to the area of the cross section of the fluid stream far behind the propeller. This fluid stream cross section area is referred to as its "size" or "effective area" and will be defined hereinafter.

To the specialist in the art, propellers operating under static conditions are chiefly lifting propellers. The criterion for assessing their effectiveness is known as the "figure of merit" and is expressed by $$P_m = \frac{T}{P}\sqrt{\frac{T}{4dA_h}}$$

where

T is the total thrust of the propeller and the shroud,
P, the total power required to produce this thrust,
$A_x$, the cross-sectional area of the fluid stream for the abscissa $x$,
$A_h$, the propeller area,
$A_\infty$, the effective area of the fluid stream,
Q, the fluid mass flow,
$\Delta_p$, the mean pressure differential created by the propeller,
d, the density of the fluid (assumed to be non- compressible)
V, the velocity, and
p, the static pressure.

The term "effective area" is to be understood as the cross-section area of the fluid stream when it has become substantially cylindrical very far downstream of the propeller. This area cannot be measured directly in practice, since an actual fluid stream mixes with the ambient fluid on exit from the shroud, but can be calculated by the formula:

$$A = \frac{Q}{\sqrt{2d\Delta_p}}$$

The customary type of diffuser is substantially conical and its maximum divergence angle is less than 5° and usually equal to about 3½°. Its length therefore becomes very large once the diffusion ratio is increased. The flow therethrough conforms with the diagram of FIG. 1, and the equipotentials 21 can be regarded as being straight lines. The product $A_x \cdot V_x$ is constant and the increasing cross-section decreases the velocity of the fluid in the direction of the flow. The decreasing velocity is accompanied by an increase in static pressure. The boundary layer must, therefore, overcome a pressure which increases in the direction of the flow. The boundary layer remains stable under such conditions only for divergence angles below the limit given above.

The fundamental difference in a diffuser duct according to the invention, shown in FIG. 3, and the conventional one just referred to, resides in that in the diffuser of the invention the slowing down of the particles of the fluid along the wall is obviated over a divergent portion of the diffuser having divergence angles well above the usual limit of divergence.

In accordance with the present invention, a distinction is made between the marginal layers adjacent the inner wall 13 that comprise the boundary layer, on the one hand, and the flow proper representing, say, 95% of the total mass of the flow, on the other, and the wall profile, in longitudinal section, is so chosen that the marginal layers have a velocity, along a meridian section of the diffuser wall, which is at least constant and not decreasing, and which preferably grows downstream. Such a velocity condition, taken in conjunction with the other physical conditions, relating to the flow and well known to those skilled in the art, enables a complete calculation to be made of the meridian curve of the diffuser duct wall, and a corollary of this condition is that the radius of curvature of the meridian curve necessarily decreases over the divergent section of the solid wall.

This will be readily appreciated by comparing FIGS. 1 and 3, in conjunction with reference to FIG. 2, which relates to a toroidal diffuser with a circular meridian, and to FIGS. 4a, 4b, 4c on which the reference letters of the curves bear subscripts corresponding to the relevant FIGS. 1 to 3. FIG. 4a is a plot of the local velocities along a diffuser wall, adjacent the boundary layer, as referred to the curvilinear abscissa O'X'. FIG. 4c is a plot, again referred to O'X' of the meridian radii of curvature. Lastly, FIG. 4b is a plot, in terms of the distance OY from the axis OX, of the velocities through a cross-section of the diffuser that may be adjacent the neck cross-section.

The nature of the theoretical flow through a toroidal diffuser of constant meridian curvature, FIG. 2, is useful for a proper appreciation of the importance of an increasing curvature, precisely because such a flow is the limiting flow with this respect. The stream lines 32 adjacent the toroidal wall and shown in broken lines are substantially, or strictly (in the sense of a planar flow about two cylinders whose generatrixes are perpendicular to the plane of the figure), circles whose center is slightly more distant from the axis OX than the center of the torus meridian curve 12. The flow velocity along the wall, corresponding to curve $A_2$ reveals a maximum value at the neck and then decreases slightly downstream of the neck, whereas in a conical diffuser it decreases as soon as the neck is reached, as shown by the curve $A_1$. The velocity along the neck section increases with increasing radius OY, as illustrated by the curve $B_2$, but decreases slightly with increasing distance from the axis OX in a conical diffuser as shown by the curve $B_1$.

Now it is well known that the the edge of a dihedron immersed in a fluid stream (along this edge the curvature radius of the wall in a plane perpendicular to the edge may be considered to have zero value), the local velocity is very high and in principle infinite, FIG. 11. This is tantamount to stating that a local increase in curvature permits increasing locally the velocity to the desired extent, since the maximum velocity has a finite value when the edge of the dihedron is rounded. Starting from the toroidal wall 12, the radius of curvature of which is constant and equal to $r_0$ as the curvilinear abscissa varies, shown by the curve $C_2$ in FIG. 4c, it will be appreciated that it is necessary to replace this wall by a wall 13, in the manner of the invention, having a radius of curvature R which decreases in the downstream direction, as shown by the curve $C_3$, in odrer that the velocity at the wall will increase in the downstream direction in obedience to the desired law illustrated by curve $A_3$ instead of the law or function of the curve $A_2$ referred to heretofore. The velocity variation through the neck section is of the same kind in both cases and can be illustrated by superimposed curves $B_2$ and $B_3$.

Thus according to the diffuser of the invention most of the flow, with the exception of the marginal layers, is slowed down and compressed over an axial length much shorter than that of a conical diffuser capable of producing the same result. With regard to the marginal layers, their recompression takes place in a zone where the diffuser wall is substantially divergent. The axial length of the portion of the meridian curve occupied by this zone in which boundary layer control means must be provided if the degree of divergence is such that the boundary layer normally tends to stall is therefore small and the power required is well below that required by a customary diffuser with increasing divergence in the direction of flow and with boundary layer control means.

A jet diffuser duct according to the invention may have a divergence angle of 30° in its divergent portion without requiring additional boundary layer control means. This is in contrast to the 3½° to 5° at the most encountered in the prior known diffusers.

Boundary layer control means, when such are provided, may be of any convenient type. For example, it is possible either to remove the boundary layer in the recompression zone by suction before it has developed sufficiently to lift from the wall, or to accelerate it by external power means.

FIG. 5 illustrates an embodiment of the invention as applied to a shrouded propeller assembly in which a propeller is positioned substantially in the neck of a shroud 51 configured according to the invention. The divergence angle of the solid wall of the diffuser forming a part of the shroud at the downstream end thereof can in this case exceed 30° provided that a wall curvature increasing in a meridian plane is combined with a propeller designed such that each blade 52 thereof receive an aerodynamic load which is greater at its tip than along the remainder of its radius. This in turn can be obtained by suitably choosing the angle of attack or pitch and the chord of each airfoil section constituting a blade. This condition is schematically represented on FIGURE 5 by an angle of attack $i$ at the blade tip greater than the angle of attack $i$ of the rest of the blade radius.

A practical example of pitch angle variation in a shrouded propeller as shown on FIG. 5, as referred to the distance $d$ of a blade cross section in which said pitch angle $p$ can be measured to the propeller rotation axis, is illustrated by FIG. 12. Curve $P_1$ relates to a blade of an usual propeller whereas curve $P_2$ relates to a propeller blade according to FIGURE 5 and shows a marked pitch angle increase in the vicinity of the blade tip. The boundary layer can thus be favourably influenced by the propeller, and furthermore the diffusion ratio of the marginal layers can be made less than that of the central or axial part of the flow.

In FIG. 5, as in the subsequent figures, the increase in the curvature of the solid wall of the diffuser toward its downstream end is evidenced by a representation of the centers of curvature of the meridian curve at several points along the sectional plane.

In FIG. 6, a propeller 60 supported by a hub 61 is positioned in the neck of a shroud 62 constituting a convergent-divergent duct 62a, 62b. The divergent section thereof has a solid wall 62b whose convex meridian has a curvature which increases as the cross-section of the divergent section increases. This wall may be of substantially the same length as that of the convergent section wall 62a. Adjacent the downstream end of the divergent wall 62b are disposed boundary layer control means comprising suction orifices 63 connected through a manifold 64 within the shroud and through conduits 65 to suitable pump means 66 for applying a suction to the boundary layer.

Likewise adjacent the downstream end of divergent wall 62b may be provided coaxial annular ducts 67 of stepped or different diameters which bound flow passages of increasing cross-section in the direction of the flow and which assist diffusion.

The slipstream or discharge stream of an open propeller narrows downstream of said propeller, its cross-section area reducing with increasing distance from the propeller. In contradistinction, the gas stream issuing from a diffuser such as those illustrated in FIGS. 5 and 6 splays out broadly before it blends into the surrounding or ambient atmosphere, thus increasing the efficiency of the propeller at low forward speeds by reducing the residual velocities in the slipstream. Moreover, since the propeller, according to the invention, is positioned at the neck of the shroud where the velocity is maximum, it is capable of transmitting very high power in relation to its diameter.

At least some among the ducts 67 can be extended upstream, adjacent the propeller 60, as shown in dotted lines in FIG. 6, and the propeller can have airfoil sections with different angles of attack within the projection of each passage or channel of divergent cross-section bounded by two adjacent ducts 67. When this is the case the total pressure downstream of the propeller will vary from one passage to another.

FIG. 7 shows a form of shrouded propeller assembly in which the shroud 72 likewise consists of a solid wall portion 72a having a convergent section and followed by another solid wall portion 72b of divergent section, whose curvature gradually increases in the direction of the flow. The walls 72a and 72b merge without a break in curvature continuity. The propeller is conical and the roots of its blades 70 are inserted into a hub so that the blades extend rearwardly in relation to the blade tips. The hub comprises a stationary portion 71a connected to the shroud 72 through struts 73 which may blend in with the conicity of the propeller and be so profiled as to affect the fluid flow in the same way as guide vanes. These struts provide a passageway for a propeller drive means, not shown.

A tangential blowing nozzle 74 is provided in the diffuser wall and opens out downstream of the propeller, thereby to stabilize the flow as stated heretofore especially the marginal layers, and to rapidly recompress the same. The hub likewise comprises in its rotating part 71b a blowing slot 75 which opens out downstream of the propeller and is fed through a passageway 76. The latter is equipped with a rotating seal 77 and is connected to the main pipe 78, which is in turn connected to a compressor 79 which provides air under pressure to the nozzle 74 and the slot 75.

The hub meridian profile must be designed in the same manner as that of the diffuser, in order to prevent stalling of the hub boundary layer and an axial backflow of fluid from the downstream end, either of which conditions would ultimately lead to a breaking up of the jet and render any form of diffusion impossible. The location of the propeller downstream of the neck enables it to perform a stabilizing function for the flow as a whole by damping out any disturbances of an external nature likely to cause the flow to rise or descend. The conical shape of the propeller is favourable from strength and aerodynamic standpoints, the obliquity of the marginal stream lines relative to the area swept by the propeller being thereby reduced.

Reference is next had to FIGS. 8 and 9 for an alternative form of embodiment of the boundary layer blowing control means illustrated in FIG. 7. The final divergence angle of the diffuser solid duct 81 of FIG. 8 is relatively small; its overall length may be approximately equal to its diameter and the wall 81b downstream of the blowing nozzle 82 may be of plain conical shape and have a developed meridian length greater than that of the upstream wall 81a of increasing curvature. In contrast, FIG. 9 illustrates a diffuser duct whose wall 91a of increasing curvature in the downstream sense is developed to a much greater extent than the terminal conical portion 91b, the divergence angle of which is virtually 90°.

In all cases, the meridian developed length of the solid wall divergent portion of the subject jet diffuser duct of this invention, in longitudinal section, is at least and preferably more than 10% of the diameter of the neck of the diffuser. The length of the divergent portion up to the edge of a blowing nozzle is markedly less than this limit.

The embodiments hereinbefore described are light in weight and have a short axial length for a given compression ratio. These embodiments lend themselves readily to the aerodynamic propulsion of such relatively low-speed vehicles as ground effect machines designed to travel over land or water, and most notably to lift airscrews utilized on aircraft. The shrouded propeller assembly configurations can be disposed with their individual axis vertical and be contained substantially within the thickness of a wing to construct a composite or VTOL aircraft with the advantage that, in accordance with the invention, the propeller diameter can be much smaller than has been usual heretofore for a given lifting force and driving power.

FIG. 10 illustrates an alternative embodiment having only a symmetry plane, in which a propeller disposed with its axis inclined is combined with a lifting wing 102 forming a convergent shroud about a propeller 100. The propeller is carried by a supporting strut 101 through which pass transmission elements extending between the engine, not shown, and the propeller. The axis of the propeller is normally inclined relative to the vertical. The wing 102 is adapted to shoud the propeller over a lower half-circumference of the swept disc thereof, and the invention applies only to this latter-mentioned portion of the propeller shroud. An upper half-circumference 103 thereof is of conventional design and blends in or merges gradually with the wing 102. The divergence of the upper shroud portion 103 at its trailing edge remains within moderate limits. In contradistinction, the trailing edge of the wing 102 has a large divergence angle, for example an angle of 90°, is provided which comprises boundary layer control means comprising a semi-circular nozzle 104 supplied with fluid under pressure by a compressor, not shown.

When the nozzle 104 is supplied with fluid, the flow thereof tends to follow the trailing edge of the wing 102 and to be consequently deflected, from a direction substantially parallel with the propeller axis, to the vertical. As compared with the previously described configuration having axial symmetry, this latter-mentioned arrangement allows both deflecting and splaying the jet.

It is to be understood that the various features and dispositions described hereinabove are by no means limited to the specific embodiments or configurations described in connection therewith. For example, vanes similar to those of the arrangement shown in FIG. 6 can be utilized for the arrangement illustrated in FIG. 10. Moreover, the various elements hereinbefore described and illustrated need not necessarily be elements of revolution, and the propeller used for the various constructional forms referred to may be of the fixed or variable pitch type and comprise, in the latter-mentioned case, means for varying its blade pitch cyclically.

The present invention may be applied to all devices utilizing diffusers, for example compressors, the exhaust systems of gas, steam of hydraulic turbines, the air inlets of high-speed aircraft, wind tunnels or ventilation systems, and the like.

What we claim and desire to secure by Letters Patent is:

1. A diffuser comprising an aerodynamically-operating convergent-divergent duct defined by a physical wall extending from an intake end to a discharge end through a throat intermediate said ends, the divergent portion of said physical wall being curvilinear in longitudinal section and having a curvature which progressively increases towards said discharge end.

2. A diffuser according to claim 1, in which the increase in curvature of said divergent wall portion starts at said throat.

3. A diffuser according to claim 1, comprising boundary layer control means in the vicinity of said discharge end.

4. A diffuser according to claim 1, comprising further a divergent conical extension coaxial with and extending downstream of said divergent wall portion, and having in longitudinal section a wall length shorter than said divergent wall portion.

5. A shrouded propeller assembly comprising in combination a shroud in the form of an aerodynamically-operating convergent-divergent duct defined by a physical wall extending from an intake end to a discharge end through a throat intermediate said ends, the divergent portion of said physical wall being curvilinear in longitudinal section and having a curvature which progressively increases towards said discharge end, a propeller having a hub and mounted within a circular transverse section of said divergent wall portion, and at least one supporting strut connected between a fixed part of said hub and said shroud.

6. A shrouded propeller assembly according to claim 5, in which said marginal layers comprise a boundary layer adjacent said wall surface, and further comprising boundary layer control means disposed in said divergent wall portion.

7. A shrouded propeller assembly according to claim 6, in which said boundary layer control means comprise means defining at least one suction orifice in said divergent wall portion adjacent said downstream end, pump means, and conduit means, whereby in operation a minor part of the fluid stream adjacent the wall can be sucked away.

8. A shrouded propeller assembly according to claim 6, in which said boundary layer control means comprise an outer end portion of a blade of said propeller having an aerodynamic profile to assist acceleration of the marginal layers including said boundary layer.

9. A shrouded propeller assembly according to claim 6, in which said boundary layer control means comprise the outermost end portion of a blade of said propeller disposed at an angle of attack greater than the angle of attack of the remainder of the blade.

10. A shrouded propeller assembly according to claim 6, in which said boundary layer control means comprise means defining an annular nozzle circumferentially of said divergent wall portion, compressor means for supplying said nozzle with an auxiliary fluid under pressure, and conduit means connecting said compressor and nozzle, whereby auxiliary fluid can be discharged from said nozzle to locally accelerate a part of the fluid stream adjacent the wall.

11. A shrouded propeller assembly according to claim 10, in which said diffuser duct comprises another conically shaped divergent wall and said annular nozzle separates the divergent wall portion of increasing curvature and said another divergent wall portion, said nozzle being disposed to discharge tangentially to both of said divergent wall portions.

12. A shrouded propeller assembly according to claim 6, further comprising a plurality of coaxial annular divergent auxiliary ducts disposed downstream of said propeller, said ducts having different, stepped diameters and defining diffuser passages of divergent cross-section for the fluid stream induced by said propeller.

13. A shrouded propeller assembly according to claim 12, further including an auxiliary duct having a leading edge and a given transverse radius in the leading edge cross-section, in which said propeller comprises a blade having different aerodynamic characteristics on radii respectively smaller and greater than the leading edge radius of said auxiliary duct, whereby the diffusion ratios relative to the two diffuser passages bounded by said auxiliary duct are also different.

14. A shrouded propeller assembly according to claim 13, in which said propeller comprises a blade having different pitch angles on radii respectively smaller and greater than the leading edge radius of said auxiliary duct, whereby the diffusion ratios relative to the two diffuser passages bounded by said auxiliary duct are also different.

15. A shrouded propeller assembly according to claim 6, in which said propeller comprises a plurality of blades having a general direction and defining with the upstream portion of the propeller axis an angle less than 90°, whereby said blades move on a conical surface when the propeller rotates.

16. A shrouded propeller assembly according to claim 10, in which said propeller comprises blades having tips rotating in the vicinity and upstream of said boundary layer control nozzle, and a rotating hub portion mounting said blades and located downstream of said nozzle.

17. A shrouded propeller assembly according to claim 5, in which said hub comprises a wall having in longitudinal section a curvature progressively increasing downstream.

18. A shrouded propeller assembly according to claim 6, in which said hub comprises a rotating portion provided with boundary layer control means for controlling the diffusion rate of the diffuser duct.

19. A shrouded propeller assembly according to claim 18, in which said hub rotating portion comprises a blowing circular nozzle located downstream of the propeller blades, and including at least one supporting strut mounting said hub in said diffuser duct, a compressor for applying a fluid under pressure to said nozzle, said struct comprising conduit means providing communication between said compressor and said nozzle.

20. A shrouded propeller assembly comprising in combination a shroud in the form of an aerodynamically-operating convergent-divergent duct defined by a physical wall extending from an intake end to a discharge end through a throat intermediate said ends, a propeller having a hub and mounted within a circular transverse section of said divergent wall portion with its rotation axis inclined with respect to the vertical, at least one supporting strut connected between a fixed part of said hub and said shroud, said divergent wall portion having at least along a lower half thereof and in longitudinal section a curvature which progressively increases towards said discharge end, and boundary layer control means in said lower half of the divergent wall portion, whereby in operation the propeller induces a fluid stream through the shroud which is progressively deflected downstream said propeller to the vertical direction under the action of said boundary layer control means.

References Cited by the Examiner

UNITED STATES PATENTS

| | | | |
|---|---|---|---|
| 2,532,482 | 12/1950 | Custer | 244—40 X |
| 2,611,685 | 9/1952 | Yoder | 138—37 X |
| 2,907,536 | 10/1959 | Zborowski. | |
| 2,922,277 | 1/1960 | Bertin. | |
| 2,944,386 | 7/1960 | Bertin et al. | 60—35.5 |
| 2,998,700 | 9/1961 | Chaplin | 60—35.5 |
| 3,012,738 | 12/1961 | Bertin et al. | 244—34 X |
| 3,029,045 | 4/1962 | Bertin et al. | 60—35.5 |
| 3,034,747 | 5/1962 | Lent | 244—23 |
| 3,045,947 | 7/1962 | Bertin et al. | 244—42 X |

FOREIGN PATENTS 785,501    10/1957    Great Britain.

SAMUEL LEVINE, *Primary Examiner.*

JULIUS E. WEST, *Examiner.*